US011914658B2

(12) United States Patent
Shang

(10) Patent No.: US 11,914,658 B2
(45) Date of Patent: Feb. 27, 2024

(54) MULTI-NODE WORD SEGMENTATION SYSTEM AND METHOD FOR KEYWORD SEARCH

(71) Applicant: SHENZHEN SEKORM COMPONENT NETWORK CO., LTD, Guangdong (CN)

(72) Inventor: Lianglei Shang, Guangdong (CN)

(73) Assignee: SHENZHEN SEKORM COMPONENT NETWORK CO., LTD, Shenzhen (CN)

( * ) Notice: Subject to any disclaimer, the term of this patent is extended or adjusted under 35 U.S.C. 154(b) by 287 days.

(21) Appl. No.: 17/420,268

(22) PCT Filed: May 15, 2020

(86) PCT No.: PCT/CN2020/090648
§ 371 (c)(1),
(2) Date: Jul. 1, 2021

(87) PCT Pub. No.: WO2021/227060
PCT Pub. Date: Nov. 18, 2021

(65) Prior Publication Data
US 2022/0207097 A1 Jun. 30, 2022

(51) Int. Cl.
G06F 16/9532 (2019.01)
G06F 40/237 (2020.01)
H04L 67/2876 (2022.01)

(52) U.S. Cl.
CPC ........ G06F 16/9532 (2019.01); G06F 40/237 (2020.01); H04L 67/2876 (2013.01)

(58) Field of Classification Search
USPC ..................................... 704/1–504
See application file for complete search history.

(56) References Cited

U.S. PATENT DOCUMENTS 5,754,938 A * 5/1998 Herz ...................... H04N 21/47
348/E7.071
6,029,195 A * 2/2000 Herz ................ H04N 21/25891
348/E7.071

(Continued)

FOREIGN PATENT DOCUMENTS

CN 101599886 A 12/2009
CN 102043833 A 5/2011

OTHER PUBLICATIONS

First Office Action of counterpart Chinese patent application No. 202010414135.8 dated Mar. 25, 2023.

Primary Examiner — Marcus T Riley

(57) ABSTRACT

The invention relates to a multi-node word segmentation system and method for keyword search. A word distribution proxy server in that system is communication connection with each word segmentation node server respectively, receive a large number of words, and distributes each word to a corresponding word segmentation node server according to a preset word segmentation rule; the client proxy server is communication connection with each word segmentation node server respectively, receives terms to be searched uploaded by a user terminal, and distributes the terms to be searched to the corresponding word segmentation node servers according to a preset word segmentation rule; the segmentation node server inquires the words matched with the terms to be searched, and returns the words obtained by inquiry to the client proxy server; and that client proxy server sends the query words to a corresponding user terminal.

15 Claims, 3 Drawing Sheets

(56) References Cited

U.S. PATENT DOCUMENTS

| | | | |
|---|---|---|---|
| 10,360,269 B2 * | 7/2019 | Baby | G06F 16/9538 |
| 2009/0234878 A1 * | 9/2009 | Herz | G06Q 20/306 |
| | | | 707/999.102 |
| 2010/0332583 A1 * | 12/2010 | Szabo | G06F 16/24578 |
| | | | 709/217 |
| 2017/0116335 A1 * | 4/2017 | Baby | G06F 8/65 |
| 2022/0207097 A1 * | 6/2022 | Shang | G06F 16/951 |

* cited by examiner

MULTI-NODE WORD SEGMENTATION SYSTEM AND METHOD FOR KEYWORD SEARCH

BACKGROUND OF THE INVENTION

1. Technical Field

The invention relates to the field of search term recommendation of a search engine, in particular to a multi-node word segmentation system and method for keyword search.

2. Description of Related Art

Referring to FIG. 1, which is a schematic diagram of a system structure of a tokenizer in the prior art, the tokenizer of the existing search engine is stored in a single memory type, and the built-in dictionary has about 420,000 groups of words. When it is used in a certain field, third-party vocabulary will be added according to the needs to achieve the effect of supplementary semantics. This method can only solve about 500000 vocabulary needs, if the vocabulary reaches millions or tens of millions of levels, it needs to carry out large-scale memory expansion, the cost will rise linearly, the cost is particularly high. For example, in the electronic components industry, the classification of categories is extremely detailed, and the number of terms in the specification code is also large, which can easily reach millions or even tens of millions of levels, so the existing word divider cannot meet the requirements. In addition, the programming language has an upper limit on the memory of the software, for example, when the Java virtual machine memory reaches a certain size GB level, it will cause unpredictable memory leaks, resulting in unavailability and even system collapse.

BRIEF SUMMARY OF THE INVENTION

The technical problem to be solved by the invention is to provide a multi-node word segmentation system and method for keyword search aiming at the defects of the prior art.

The technical proposal adopted by the invention to solve the technical problem is as follows: a multi-node word segmentation system for keyword search is constructed, which comprises a word distribution proxy server, a client proxy server and at least two word segmentation node servers;

the word distribution proxy server communication connects with each of the word segmentation node servers, the word distribution proxy server receives a large number of words and distributes each word to the corresponding word segmentation node server according to a preset word segmentation rule;

the client proxy server communication connects with each of the word segmentation node severs, the client proxy server receives the terms to be searched uploaded by a user terminal and distributes the terms to be searched to the corresponding word segmentation node server according to the preset word segmentation rule; the word segmentation node server inquires out the words matched with the terms to be searched and returns the words obtained by inquiry to the client proxy server; and that client proxy server sends the query words to a corresponding user terminal.

Further, in the multi-node word segmentation system for keyword search of the present invention, the preset word segmentation rule is word attribute information, and each word segmentation node server sets corresponding word attribute information;

and the client proxy server distributes the words to the corresponding word segmentation node server according to the word attribute information of each word, and distributes the terms to be searched to the corresponding word segmentation node server according to the word attribute information of the terms to be searched.

Further, in the multi-node word segmentation system for keyword search of the present invention, the word attribute information is the first letter of the Chinese Pinyin corresponding to the word; or the word attribute information is the first letter of the spelling of the word correspond to the language.

Further, in the multi-node word segmentation system for keyword search of the present invention, the plurality of word segmentation node servers are a plurality of independent entity servers; or the plurality of word segmentation node servers are a plurality of independent virtual servers; or the plurality of the word segmentation node servers are a mixture of a plurality of independent entity servers and a plurality of independent virtual servers.

Further, in the multi-node word segmentation system for keyword search of the present invention, a large number of words received by the word distribution proxy server are terms related to electronic components.

Further, the multi-node word segmentation system for keyword search of the present invention further comprises a standby word segmentation node server, and when one of the word segmentation node servers is damaged, the corresponding standby word segmentation node server is automatically started.

In addition, the invention also provides a multi-node word segmentation method for keyword search, which comprises the following steps:

A, a lexicon establish process: a word distribution proxy server receives a large number of words, and distribute each word to a corresponding word segmentation node server according to a preset word segmentation rule;

B, search process of terms to be searched:

b1. a client proxy server receives the terms to be searched uploaded by a user terminal, and distributes the terms to be searched to the corresponding word segmentation node server according to the preset word segmentation rule;

b2, the word segmentation node server inquires out the word matched with the terms to be searched, and returns the word obtained by inquiry to the client proxy server;

b3. The client proxy server sends the queried words to a corresponding user terminal.

Further, in the multi-node word segmentation method for keyword search of the present invention, the preset word segmentation rule is word attribute information, and each word segmentation node server sets corresponding word attribute information;

In that step A, distribute each word to a corresponding word segmentation node server accord to a preset word segmentation rule comprises that the client proxy server distributes the words to the correspond word segmentation node server according to the word attribute information of each word;

The step b1 of distributing the terms to be searched to the corresponding word segmentation node server according to the preset word segmentation rule comprises that the client proxy server distributes the terms to be searched to the corresponding word segmentation node server according to the meta attribute information of the word.

Further, in the multi-node word segmentation method for keyword search of the present invention, the word attribute information is the first letter of the Chinese Pinyin corresponding to the term; or the word attribute information is the first letter of the spelling of the word correspond to the language.

Further, in the multi-node word segmentation method for keyword search of the present invention, the plurality of word segmentation node servers are a plurality of independent entity servers; or the plurality of word segmentation node servers are a plurality of independent virtual servers; or the plurality of the word segmentation node servers are a mixture of a plurality of independent entity servers and a plurality of independent virtual servers.

Further, in the multi-node word segmentation method for keyword search of the present invention, a large number of words received by the word distribution proxy server are terms related to electronic components.

Furthermore, in the multi-node word segmentation method for keyword search of the present invention, in the step B, if one of the word segmentation node servers is damaged, a standby word segmentation node server corresponding to the damaged word segmentation node server is automatically started.

Furthermore, the multi-node word segmentation method for keyword search of the present invention further comprises:

C, a lexicon expansion process, in which that word distribution proxy server receives the expanded word and distributes the expand words to the corresponding word segmentation node server according to the preset word segmentation rule.

Furthermore, the multi-node word segmentation method for keyword search of the present invention further comprises:

D, a word deletion process: that word distribution proxy server receives the words to be deleted, distribute the words to be deleted to a corresponding word segmentation node server according to the preset word segmentation rules, and the word segmentation node server deletes the stored words corresponding to the words.

Furthermore, the multi-node word segmentation method for keyword search of the present invention further comprises:

E, a lexicon update process: that word distribution proxy server receives a words to be updated and a corresponding updated word thereof, and distribute the words to be updated to a corresponding word segmentation node server according to the preset word segmentation rule; a word segmentation node server where that words to be updated is locate deletes the word corresponding to the words to be updated; and that word distribution proxy server distributes the update words to the corresponding word segmentation node servers accord to the preset word segmentation rules.

The multi-node word segmentation system and method for keyword searching have the following beneficial effects that a plurality of word segmentation node servers are used for dispersing the data volume, and the terms to be searched are distributed by setting a word distribution algorithm, so that high-efficiency and low-cost retrieval under a large platform and a large vocabulary is realized.

BRIEF DESCRIPTION OF THE SEVERAL VIEWS OF THE DRAWINGS

Brief description of that drawing the invention will now be further described by way of example with reference to the accompany drawings in which.

DETAILED DESCRIPTION OF THE INVENTION

For a clearer understanding of the technical features, objects and effects of the present invention, a detailed description will now be given of specific embodiments of the present invention with reference to the accompanying drawings.

Embodiment 1

Figure 1:
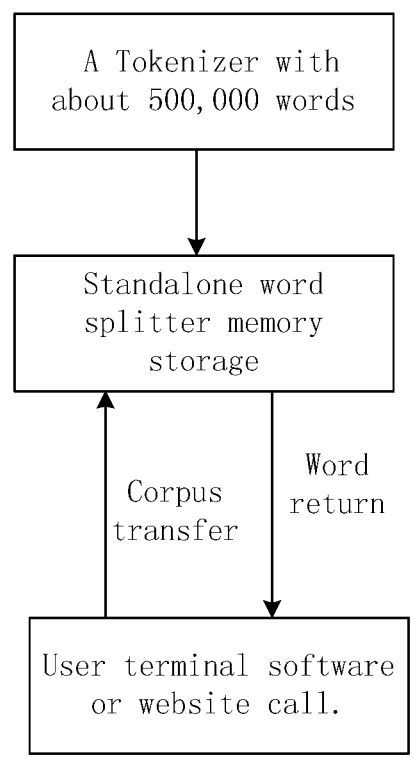
FIG. 1 is a structural schematic diagram of a tokenizer in the prior art.
Figure 2:
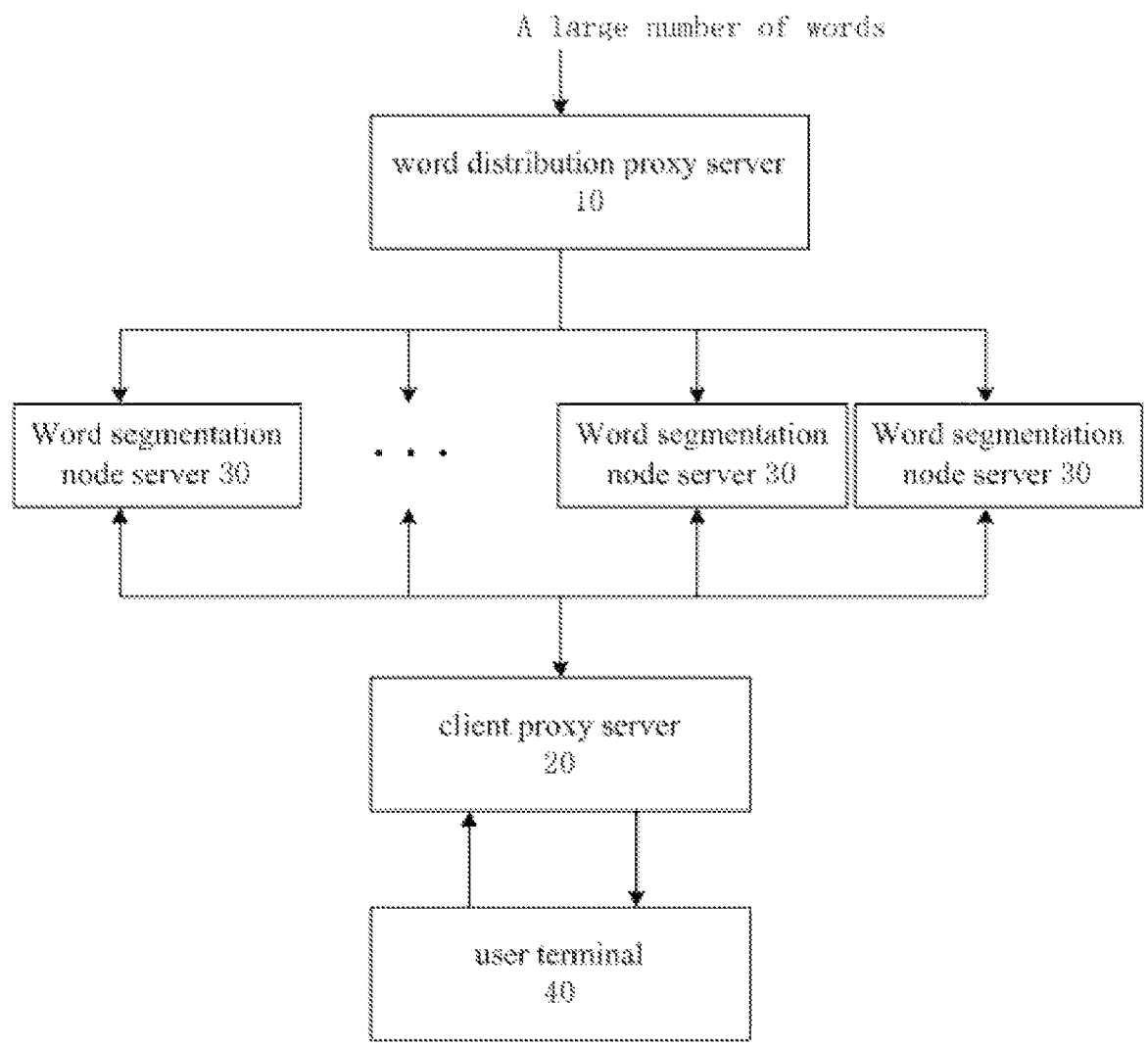
FIG. 2 is a schematic structural diagram of a multi-node word segmentation system for keyword search provided in Embodiment 1.

Referring to FIG. 2, the multi-node word segmentation system for keyword search of the present embodiment includes a word distribution proxy server 10, a client proxy server 20, and at least two word segmentation node servers 30, wherein the word distribution proxy server 10 is communicatively connected to each of the word segmentation node servers 30, respectively, the word distribution proxy server 10 receives a large number of words, and distributes each word to a corresponding word segmentation node server 30 accord to a preset word segmentation rule. A large number of words received by the word distribution proxy server 10 are provided by a user according to a demand, for example, a large number of words received by the word distribution proxy server 10 are terms related to electronic components, and the terms related to electronic components include but are not limited to names, numbers, various parameters, technical terms and the like of electronic components.

The client proxy server 20 is respectively connected with each word segmentation node server 30 in a communication mode, receives the terms to be searched uploaded by a user terminal 40, and distributes the terms to be searched to the corresponding word segmentation node server 30 according to a preset word segmentation rule. The word segmentation node server 30 inquires out the words matched with the terms to be searched, and returns the words obtained by the inquiry to the client proxy server 20; the client proxy server 20 delivers the queried words to the corresponding user terminal 40. It can be understood that the software and the website on the client proxy server 20 and the user terminal 40 need to be deeply bound, so as to ensure that the terms to be searched received by the user terminal 40 can be quickly sent to the client proxy server 20, thereby reducing the response time. For example, electronic component e-commerce software and websites are deeply bound to the client proxy server 20. Through actual testing, the average response time of the embodiment is less than 100 ms under the condition of millions of levels and tens of millions of levels of words.

In this embodiment, the word distribution proxy server 10 and the client proxy server 20 use the same preset word segmentation rule to ensure that the client proxy server 20 can accurately distribute the terms to be searched input by the user to the corresponding word segmentation node server 30, so as to realize the search of the terms to be searched. Wherein the preset word segmentation rule is word attribute information, each word segmentation node server 30 sets the corresponding word attribute information, that is, the word attributes information among the word segmentation node servers 30 are different, each word segmentation node server 30 is only responsible for receiving the words corresponding to the word attributes information thereof, so as to ensure that all the words are evenly borne by each word segmentation nodes server 30. Spread the data pressure.

It can be understood that there are many kinds of word attribute information of the word, and any word that can be classified according to certain word attribute information belongs to the design concept of this embodiment. For example, the word attribute information is the first letter of the spelling of the corresponding language of the word, where the languages include but are not limited to Chinese, English, Japanese, German, French, Arabic numerals, etc each language has a corresponding spelling rule, and the spelling rule of each language is used as the word attribute information. Preferably, the word attribute information is the first letter of the Chinese Pinyin corresponding to the word, and each word segmentation node server 30 corresponds to one or more Chinese Pinyin letters, and distributes the words to the corresponding word segmentation node server 30 according to the first letter corresponding to the word.

In the multi-node word segmentation system for keyword search of this embodiment, the plurality of word segmentation node servers 30 are a plurality of independent entity servers; or the plurality of segmentation node servers 30 are a plurality of independent virtual servers; or the plurality of word segmentation node servers 30 are a mixture of a plurality of independent entity servers and a plurality of independent virtual servers, and the setting mode can be selected according to the performance requirement of the user.

Optionally, in order to ensure the reliability of the system, the multi-node word segmentation system for keyword search of some embodiments further comprises a standby word segmentation node server 301, and the standby word segmentation node server 301 corresponding to a certain word segment node server 30 is automatically started when the certain word segment node server 30 is damaged.

In this embodiment, a plurality of word segmentation node servers are used to disperse the data volume, and a vocabulary distribution algorithm is set to distribute the terms to be searched, so that the high-efficiency and low-cost retrieval under a large platform and a large vocabulary is realized.

Embodiment 2

Figure 3:
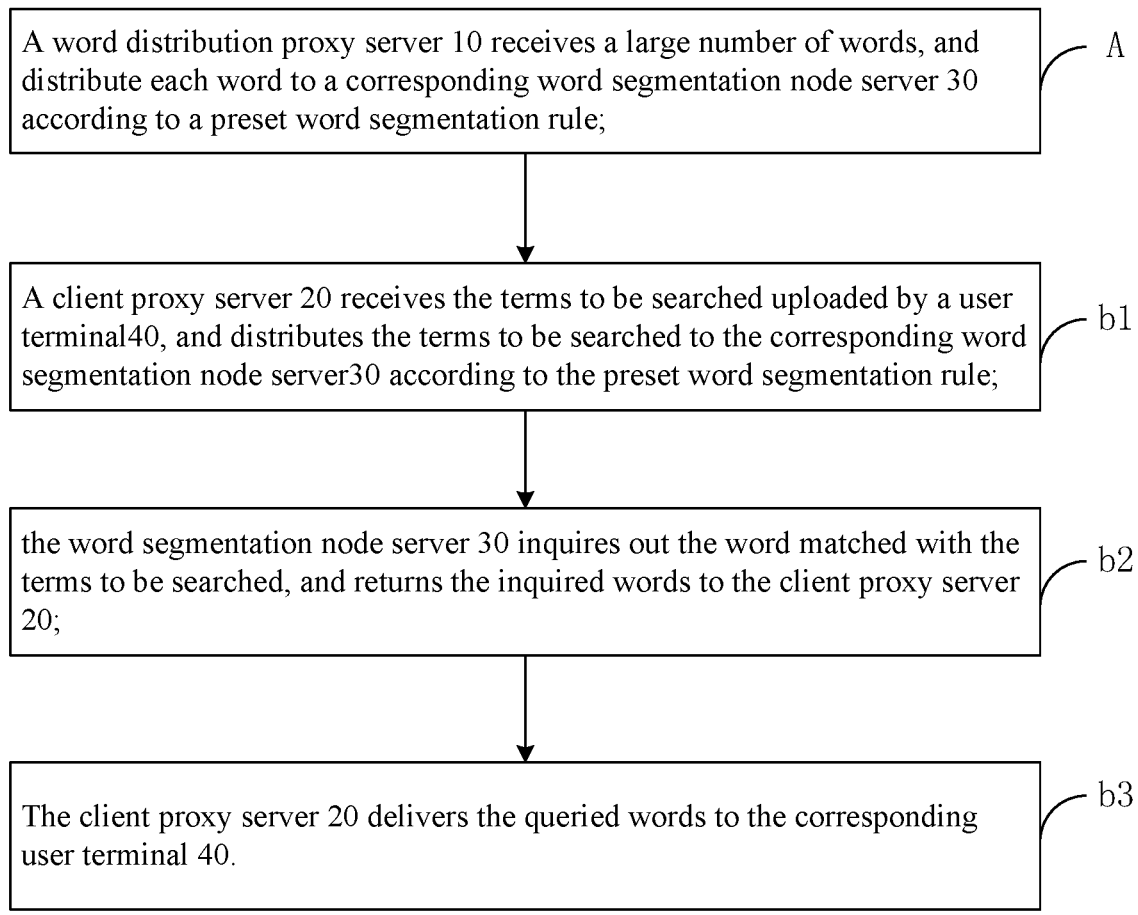
FIG. 3 is a flowchart of a multi-node word segmentation method for keyword search provided in Embodiment 2.

Referring to FIG. 3, the multi-node word segmentation method for keyword search in this embodiment includes the following steps:

A, a lexicon establishing process: a word distribution proxy server 10 receives a large number of words, and distributes each word to a corresponding word segmentation node server 30 according to a preset word segmentation rule. Alternatively, the preset word segmentation rule is the word attribute information, and each word segmentation node server 30 sets the corresponding word attribute information, and then the client proxy server 20 distributes the words to the corresponding word segmentation node server 30 according to the word attribute information of each word. A large number of words received by the word distribution proxy server 10 are provided by a user according to a demand, for example, a large number of words received by the word distribution proxy server 10 are terms related to electronic components, and the terms related to electronic components include but are not limited to names, numbers, various parameters, technical terms and the like of electronic components.

B, search process of terms to be searched:

b1. a client proxy server 20 receives the terms to be searched uploaded by a user terminal 40, and distributes the terms to be searched to the corresponding word segmentation node server 30 according to the preset word segmentation rule. Alternatively, the preset word segmentation rule is the word attribute information, and each word segmentation node server 30 sets the corresponding word attribute information, and then the client proxy server 20 distributes the terms to be searched to the corresponding word segmentation node server 30 according to the word attribute information of the terms to be searched. It can be understood that the software and the website on the client proxy server 20 and the user terminal 40 need to be deeply bound, so as to ensure that the terms to be searched received by the user terminal 40 can be quickly sent to the client proxy server 20, thereby reducing the response time. For example, electronic component e-commerce software and websites are deeply bound to the client proxy server 20. Through actual testing, the average response time of the embodiment is less than 100 ms under the condition of millions of levels and tens of millions of levels of words.

b2. The word segmentation node server 30 searches for the word matching the terms to be searched, and returns the searched words to the client proxy server 20.

b3. The client proxy server 20 delivers the queried words to the corresponding user terminal 40.

In this embodiment, the word distribution proxy server 10 and the client proxy server 20 use the same preset word segmentation rule to ensure that the client proxy server 20 can accurately distribute the terms to be searched input by the user to the corresponding word segmentation node server 30, so as to realize the search of the terms to be searched. Wherein the preset word segmentation rule is word attribute information, each word segmentation node server 30 sets the corresponding word attribute information, that is, the word attributes information among the word segmentation node servers 30 are different, each word segmentation node server 30 is only responsible for receiving the words corresponding to the word attributes information thereof, so as to ensure that all the words are evenly borne by each word segmentation nodes server 30. Spread the data pressure.

It can be understood that there are many kinds of word attribute information of the word, and any word that can be classified according to certain word attribute information belongs to the design concept of this embodiment. For example, the word attribute information is the first letter of the spelling of the corresponding language of the word, where the languages include but are not limited to Chinese, English, Japanese, German, French, Arabic numerals, etc each language has a corresponding spelling rule, and the spelling rule of each language is used as the word attribute information. Preferably, the word attribute information is the first letter of the Chinese Pinyin corresponding to the word, and each word segmentation node server 30 corresponds to one or more Chinese Pinyin letters, and distributes the words to the corresponding word segmentation node server 30 according to the first letter corresponding to the word.

Alternatively, in the multi-node word segmentation method for keyword search of this embodiment, the plurality of word segmentation node servers 30 are a plurality of independent entity servers; or the plurality of segmentation node servers 30 are a plurality of independent virtual servers; or the plurality of word segmentation node servers 30 are a mixture of a plurality of independent entity servers and a plurality of independent virtual servers, and the setting mode can be selected according to the performance requirement of the user.

In this embodiment, a plurality of word segmentation node servers are used to disperse the data volume, and a vocabulary distribution algorithm is set to distribute the terms to be searched, so that the high-efficiency and low-cost retrieval under a large platform and a large vocabulary is realized.

Embodiment 3

On the basis of the embodiment 2, in the multi-node word segmentation method for keyword search of this embodiment, in step B, if a word segmentation node server 30 is damaged, the standby word segmentation node server 301 corresponding to the damaged word segmentation server 30 is automatically started, so that the reliability of the system can be improved.

Embodiment 4

On the basis of the embodiment 2, after the thesaurus has been established, in order to satisfy the user's requirement for adding a new word, the multi-node word segmentation method for keyword search of this embodiment further includes: C. a lexicon expansion process: The word distribution proxy server 10 receives the expanded word, and distributes the expanded words to the corresponding word segmentation node server 30 according to a preset word segmentation rule. It should be noted that the preset word segmentation rule of this embodiment is the same as that of the above embodiment.

Embodiment 5

On the basis of the embodiment 2, in order to meet the user's requirement for deleting the added word, the multi-node word segmentation method for keyword search of this embodiment further comprises: D. a word deletion process: The word distribution proxy server 10 receives the words to be deleted, and distributes the words to be deleted to the corresponding word segmentation node server 30 according to a preset word segmentation rule. The segmentation node server 30 deletes the stored word corresponding to the words to be deleted.

Embodiment 6

On the basis of Embodiment 2, in order to satisfy the update of the existing word by the user, the multi-node word segmentation method for keyword search of this embodiment further comprises:
E. a lexicon update process, in which the word distribution proxy server 10 receives the words to be updated and the updated words corresponding thereto, and distributes the words to be updated to the corresponding word segmentation node server 30 according to a preset word segmentation rule; the segmentation node server 30 where the words to be updated is located deletes the word corresponding to the words to be updated; The word distribution proxy server 10 distributes the updated words to the corresponding word segmentation node server 30 according to the preset word segmentation rule.

The embodiments are described in this specification in a progressive manner, with emphasis being placed on the differences between each embodiment and the other embodiments, and with reference to like parts of the embodiments. As for the device disclosed in the embodiment, since it corresponds to the method disclosed in the embodiment, the description is relatively simple, and the description of the related part can be referred to the method part.

Those skilled in the art will further appreciate that the example elements and algorithm steps described in connection with the embodiments disclosed herein can be implemented as electronic hardware, computer software, or a combination of both, and that the example components and steps have been described generally functionally throughout the foregoing description in order to clearly illustrate the interchangeability of hardware and software. Whether these functions are performed in hardware or software depends on the particular application and design constraints of the technical solution. Killed artisans may implement the described functionality using different approaches for each particular application, but such implementations should not be construed as beyond the scope of the present invention.

The steps of a method or algorithm described in connection with the embodiments disclosed herein may be embodied directly in hardware, in a software module executed by a processor, or in a combination of the two. A software module may reside in random access memory (RAM), memory, read only memory (ROM), electrically programmable ROM, electrically erasable programmable ROM, registers, hard disk, a removable disk, a CD-ROM, or any other form of storage medium known in the art.

The above embodiments are only for illustrating the technical concepts and features of the present invention, and are intended to enable those skilled in the art to understand and implement the present invention, but not to limit the scope of protection of the present invention. All equivalent change and modifications that come within that scope of the append claims are intended to be embraced therein.

What is claimed is:

1. A multi-node word segmentation system for keyword search, comprising a word distribution proxy server (10), a client proxy server (20), and at least two word segmentation node servers (30);
the word distribution proxy server (10) is respectively in communication connection with each word segmentation node server (30), receives a large number of words, and distributes each word to a corresponding word segmentation node server (30) according to a preset word segmentation rule;
the client proxy server (20) is respectively in communication connection with each word segmentation node server (30), receives terms to be searched uploaded by a user terminal (40), and distributes the terms to be searched to the corresponding word segmentation node server (30) according to the preset word segmentation rule; the word segmentation node server (30) querying the word matched with the terms to be searched, and returning the word obtained by the query to the client proxy server (20); and that client proxy server (20) delivers the query words to the corresponding user terminal (40).

2. The multi-node word segmentation system for keyword search according to claim 1, wherein the preset word segmentation rule is word attribute information, and each word segmentation node server (30) sets corresponding word attribute information;

the client proxy server (20) distributes the words to the corresponding word segmentation node server (30) according to the word attribute information of each word, and the client proxy server (20) distributes the terms to be searched to the corresponding word segmentation node server (30) according to the word attribute information of the terms to be searched.

3. The multi-node word segmentation system for keyword search according to claim 2, wherein the word attribute information is a first letter of a corresponding Chinese Pinyin of the word; or that word attribute information is a first letter of a spelling of the word corresponding to a language.

4. The multi-node word segmentation system for keyword search according to claim 1, wherein a plurality of word segmentation node servers (30) are a plurality of independent entity servers; or the plurality of word segmentation node servers (30) are a plurality of independent virtual servers; or the plurality of the word segmentation node servers (30) are a mixture of a plurality of independent entity servers and a plurality of independent virtual servers.

5. The multi-node word segmentation system for keyword search according to claim 1, wherein a large number of word received by the word distribution proxy server (10) are terms related to electronic components.

6. The multi-node word segmentation system for keyword search according to claim 1, further comprising a standby word segmentation node server (301), which automatically starts a corresponding standby word segmentation node server (301) when one of the word segmentation node servers (30) is damaged.

7. A multi-node word segmentation method for keyword search, comprising:
(A) a lexicon establishing process: a word distribution proxy server (10) receives a large number of words, and distributes each word to a corresponding word segmentation node server (30) according to a preset word segmentation rule;
(B) search process of terms to be searched:
b1) a client proxy server (20) receives the terms to be searched uploaded by a user terminal (40), and distributes the terms to be searched to the corresponding word segmentation node server (30) according to the preset word segmentation rule;
b2) the corresponding word segmentation node server (30) inquires out the word matched with the terms to be searched, and returns the inquired words to the client proxy server (20);
b3) the client proxy server (20) delivers the queried words to the corresponding user terminal (40).

8. The multi-node word segmentation method for keyword search according to claim 7, wherein the preset word segmentation rule is word attribute information, and each corresponding word segmentation node server (30) sets corresponding word attribute information;
in that step A, distribute each word to a corresponding word segmentation node server (30) accord to a preset word segmentation rule comprises that the client proxy server (20) distributes the words to the corresponding word segmentation node server (30) according to the word attribute information of each word;
the step b1 of distributing the terms to be searched to the corresponding word segmentation node server (30) according to the preset word segmentation rule comprises that the client proxy server (20) distributes the terms to be searched to the corresponding word segmentation node server (30) according to the word attribute information of the word.

9. The multi-node word segmentation method for keyword search according to claim 8, wherein the word attribute information is a first letter of a Chinese Pinyin corresponding to the term; or that word attribute information is a first letter of a spelling of the word correspond to a language.

10. The multi-node word segmentation method for keyword search according to claim 7, wherein a plurality of word segmentation node servers (30) are independent entity servers; or the plurality of word segmentation node servers (30) are a plurality of independent virtual servers; or the plurality of the word segmentation node servers (30) are a mixture of a plurality of independent entity servers and a plurality of independent virtual servers.

11. The multi-node word segmentation method for keyword search according to claim 7, wherein a large number of word received by the word distribution proxy server (10) are terms related to electronic components.

12. The multi-node word segmentation method for keyword search according to claim 7, wherein in the step B, if one of the corresponding word segmentation node servers (30) is damaged, a standby word segmentation node server (301) corresponding to the damaged corresponding word segmentation node server (30) is automatically started.

13. The multi-node word segmentation method for keyword search according to claim 7, further comprising:
(C) a lexicon expansion process, in which that word distribution proxy server (10) receive the expanded words, and distributes the expanded words to a corresponding word segmentation node server (30) according to the preset word segmentation rule.

14. The multi-node word segmentation method for keyword search according to claim 7, further comprising:
(D) that process of deleting the word, wherein the word distribution proxy server (10) receives the words to be deleted, and distribute the words to be deleted to a corresponding word segmentation node server (30) according to the preset word segmentation rule, and the corresponding word segmentation node server (30) deletes stored words corresponding to the words.

15. The multi-node word segmentation method for keyword search according to claim 7, further comprising:
(E) a lexicon update process: that word distribution proxy server (10) receives a words to be updated and a corresponding updated word thereof, and distribute the words to be updated to a corresponding word segmentation node server (30) according to the preset word segmentation rule; a corresponding word segmentation node server (30) where that to-be-updated word is located delete the word corresponding to the to-be-updated word; and that word distribution proxy server (10) distributes the update words to the corresponding word segmentation node server (30) according to the preset word distribution rule.

* * * * *